United States Patent [19]

Le Vantine

[11] Patent Number: 4,692,849
[45] Date of Patent: Sep. 8, 1987

[54] HEAT FREE EXAMINATION LIGHT WITH FULLY ROTATABLE HEAD AND ARM

[76] Inventor: Allan D. Le Vantine, 18225 Rancho St., Tarzana, Calif. 91356

[21] Appl. No.: 766,572

[22] Filed: Aug. 16, 1985

[51] Int. Cl.⁴ ............................................. F21V 21/18
[52] U.S. Cl. .................................. 362/402; 362/275; 362/413; 362/414; 248/292.1
[58] Field of Search .............. 362/275, 402, 410, 413, 362/414, 804; 248/292.1; 403/118

[56] References Cited

U.S. PATENT DOCUMENTS

| | | | |
|---|---|---|---|
| 1,633,538 | 6/1927 | Mensing | 362/411 X |
| 1,854,890 | 4/1932 | Dugdill et al. | 403/117 |
| 2,491,448 | 12/1949 | Hillenbrand et al. | 362/414 X |
| 2,579,018 | 12/1951 | Schwinn | 362/275 X |
| 2,884,513 | 4/1959 | Giller | 362/804 X |
| 3,239,184 | 3/1966 | Kirkeby | 362/414 X |
| 4,165,530 | 8/1979 | Sowden | 362/401 |
| 4,380,794 | 4/1983 | Lawson | 362/296 |

FOREIGN PATENT DOCUMENTS

| | | | |
|---|---|---|---|
| 892482 | 8/1953 | Fed. Rep. of Germany | 362/410 |
| 91873 | 6/1958 | Norway | 248/292.1 |
| 631480 | 11/1949 | United Kingdom | 362/413 |

Primary Examiner—Samuel Scott
Assistant Examiner—Allen J. Flanigan

[57] ABSTRACT

A novel examination light that utilizes a quartz halogen lamp and dichroic reflector to produce heat free white light, mounted on a versatile support arm that is moveable in a vertical arc through any angle about a support axes and is counterbalanced by a unique spring and friction arrangement that allows it to remain, drift free, at any location. The arm is mounted on a vertical pole affixed in a castered base and is rotatable through a horizontal circle of almost two revolutions.

5 Claims, 8 Drawing Figures

HEAT FREE EXAMINATION LIGHT WITH FULLY ROTATABLE HEAD AND ARM

BACKGROUND OF THE INVENTION

1. Field of the Invention

This invention refers to an examination light and more particularly to a lamp and optics with mounting means supported on an arm that is moveable through two planes, vertically and horizontally, and additionally to the mounting means which is rotatable in two planes about its own axes, and to the separation of the energy emitted by the lamp in to white light and infrared heat and to the redirection of the white light for illumination purposes and to the elimination of the infrared heat from the mounting means.

2. Description of the Prior Art

Moveable mounted examination lights have long been known. They are used in the medical field for illuminating specific areas of the body for specific office or surgical procedures. They are used by designers and draftsmen illuminating and examining their work. And they are used by artisans to increase the visibility of the products upon which they labor. Lights of this nature vary in design from the simple "Goose Neck" (flexible tube) with an incandescent bulb and reflector on its end to the sophisticated counterbalanced surgicallight with high intensity lamps and complex optics. between these extremes are lamps supported on articulated structures incorporating springs and friction joints such as that of Scattolin et. al. U.S. Pat. No. 4,213,172, which is a typical drafting table type device, or that of Mathers, U.S. Pat. No. 4,494,177 of similar design. In contrast, Sowden et. al. U.S. Pat. No. 4,165,530 presents a more intricate design, whereby two separate friction elements are combined in one hub to independently stabilize two separate sections of a lamp supporting arm.

There are innumerable designs incorproating springs as a means for counterbalancing supporting arms, however most of them do not provide an exact relationship to oppose the gravitational forces on the arm at all points through its freedom of travel, and therefore must rely on frictional forces at the pivots to restrict motion at the positions of imbalance. Such is the case with the art of Saluja U.S. Pat. No. 4,107,769. Saluja, similar to many others, utilizes a compression spring within the lumen of a tubular arm to provide a hidden counterbalance means. All spring arrangements of this type can at best provide exact balance only at two nodes throughout the half arc freedom of motion of the arm.

the only method whereby an exact spring counterbalance could be achieved for all positions of such an arm is by the use of a cam and spring loaded cam follower design to exactly match the springforce and the gravitational force on the arm. Even so, a cam design, because of the requirement for small size, has to be made so highly loaded by the required spring force that the frictional forces produced at the pivots and in the bearings obviates the effect of the near perfect balance. Hence the value of such a design is questionable.

In addition to their primary purpose support arms and structures must provide motion in a horizontal plane. To this purpose the base end of the arm or structure usually is attached to a vertical shaft retained in a base structure. Bearings either in the base structure or in the arm attachingmeans permits the horizontal rotation. In mounted medical lights the base structure is attached to a pole which projects from the mounting arrangement.

Independent rotation of the support means for the lamp and optics mounted at the end of the arm are accomplished usually by one of three basic methods, the most common and simple of which is the use of a captured ball clamped between cup sockets held together by a screw means which applies friction to the ball, thereby preventing motion between the two. One element, usually the ball, is affixed to the support means and the other element, the sockets, is a component of the arm. Movement of the support means is accomplished by manually overcoming the friction of the ball and sockets.

Another basic method is by the use of two frictional pivots in orthagonal planes. One provides rotation about the axis of the support means, and the other permits the support means to be rotated through an arc in a vertical plane about an axis positioned very close to the support means.

A third basic method, and one used mostly in the medical field, is that of gimbal mounting the support means. This method is utilized where it is desireable to eliminate unwanted frictional resistance to the movement of the lamp and optics support means. It consists of a yoke, or gimbal, which incorporates axial aligned pivots, one on either side of the support means, along a transverse axis of the support means which is located at its transverse center of gravity. Thus, the support means is in balance about its transverse axis and thus can be easily rotated and will remain at any angle at which it is placed. Similarly, the yoke is pivoted along the longitudinal axis of the support means at its longitudinal center of gravity, thus providing similar ease of movement and balance along the longitudinal axis.

The lamp which is the luminous source for the examination light can be of several types. Initially, incandescent lamps of the home variety were used exclusively, and still are, for draftsmen and artisan type lights and for some medical lights. These have been augmented by fluorescent lamps, which are advocated for certain applications. High pressure gas arc lamps are also used as a luminous source for some special applications, however, the electrical complexities required to operate them and the need for sophisticated optical projection systems to use them, severely limits their application. The use of halogen type lamps has become the standard source for use in medical lights. Because of their higher filament temperature they provide a whiter, brighter, and smaller source for illumination than all others with the exception of the high pressure gas arc. However, the halogen lamp does not require any special electrical circuitry and as a source is sufficiently larger than the arc to accomodate the use of ordinary optical elements for projection.

Light from the illumination source is directed to the examination area by means which range from simple non-optical white painted reflectors, to complex and intricate optical projection systems. Most commonly, a single optical reflector is used to collect light from a large solid angle about the source, and reimage the source in the examination area.

In many instances, such as with medical lights, it is desireable to render the light as white, or as close to that of sunlight as possible, in order to provide the observation of color as true as possible. Two filtering methods are used to render the light whiter. One method utilizes an absorption filter between the source and the target or examination area. The absorption filter absorbs or reflects back toward the source the infrared heat from the lamp and allows only the whiter light to pass through to the target. Another method is by the use of a pass filter. a pass filter is usually incorproated in a reflecting element in a manner such that it reflects only the white light to the target area. The filter permits the infrared to pass through the reflecting element and out of the optical system.

SUMMARY OF THE INVENTION

Accordingly it is an object of the invention to provide an improved examination light.

It is another objective to provide an improved supporting arm for the light head that enables the arm to travel through an arc in the verticalplane across top dead center from one side to the other.

It is another objective to provide an improved post means for supporting the arm and for giving the arm a range of motion in the horizontal plane exceeding a full circle.

It is another objective to provide an improved spring and friction design for counterbalancing the weight of the lamp head and arm on both sides of top dead center.

It is another objective to provide an improved rotation means for the lamp head enabling it to be rotated in excess of a full circle about its longitudinal axis.

It is yet another objective to provide an improved design of the lamp, optics and lamp head whereby infrared heat is removed from the lamp source leaving only the white light for illumination purposes.

The above and other objectives of the present invention are achieved, according to a preferred embodiment thereof, by providing a base means which provides a stable support for the components of the examination light. The base means has four horizontal extensions to increase its stability and which also provide a location for attaching castered wheels by which the light may be rolled across a floor. Upon the base is a housing which encloses electrical connections and a transformer for the lamp of the examination light. Projecting vertically from the center of the housing in the preferred embodiment is a vertical hollow tubular pole, extending three feet in length, which terminates in a parallelepiped enclosure which contains the pivot and counterbalancing mechanism for the lamp head supporting arm.

The supporting arm is attached to, and originates from, a horizontal shaft extending from one side of the parallelepiped enclosure, and extends perpendicular to the horizontal shaft a distance of sixteen inches, in this preferred embodiment. The arm is freely moveable to all positions in the plane except to a small angle on either side of the bottom center location. The arm also is able to move in a horizontal plane by rotating the housing and the hollow tubular pole, as the pole is freely rotatable in its base.

The lamp head is affixed to the end of the arm. It is rotatable about an axis aligned with the axis of the arm, by the means of the rotatability of the arm. The point of attachment of the lamp head to the arm also acts as a pivot enabling the lamphead to be moved about an axis orthagonal to the axis of the arm.

In this preferred embodiment the lamp head consists of a metal case of a surface of varying diameters of concentric sections of adjacent cones and cylinders. It is attached to the arm near its mid-point along one side. The light is projected from one end of the cylindrical structure, and the heat is emitted through a series of louvre-like spaced apart discs on the opposite end. On the side opposite the attachment point a handle is affixed to povide ease in moving the lamp head.

In this preferred embodiment the lamp, within the lamp head, is surrounded by a single optical element, a reflector. The reflector serves to direct the radiant energy from the lamp to the area to be illuminated. The lamp is a low voltage Halogen type. The reflector is small, in this embodiment approximately two inches in diameter, and is in the shape of a conic section of revolution. It is fabricated of borosilicate glass (trade name Pyrex) and is treated on its inner surface by a vacuum deposited multilayered interference coating. This coating reflects the visible, shorter wave lengths of the electromagnetic spectrum and transmits the longer wavelengths of red and infra-red. Thus, the shorter wave lengths, or the whiter light is focused by the reflector and directed to the area to be illuminated, while the longer wave lengths, which represent the heat portion of the light, passes through the eflector and impinges on baffles to absorb that energy and transmit it to the surrounding air within the lamp head. By natural convection this heated air flows through the louvred end of the lamp head thereby transmitting the heat to the surrounding environment.

BRIEF DESCRIPTION OF THE DRAWINGS

For a complete understanding of the above and other embodiments of the invention together with an appreciation of the objectives and ramifications thereof, please refer to the attached drawings and the following descriptions of the drawings in which.

DESCRIPTION OF THE PREFERRED EMBODIMENT

Figure 1:
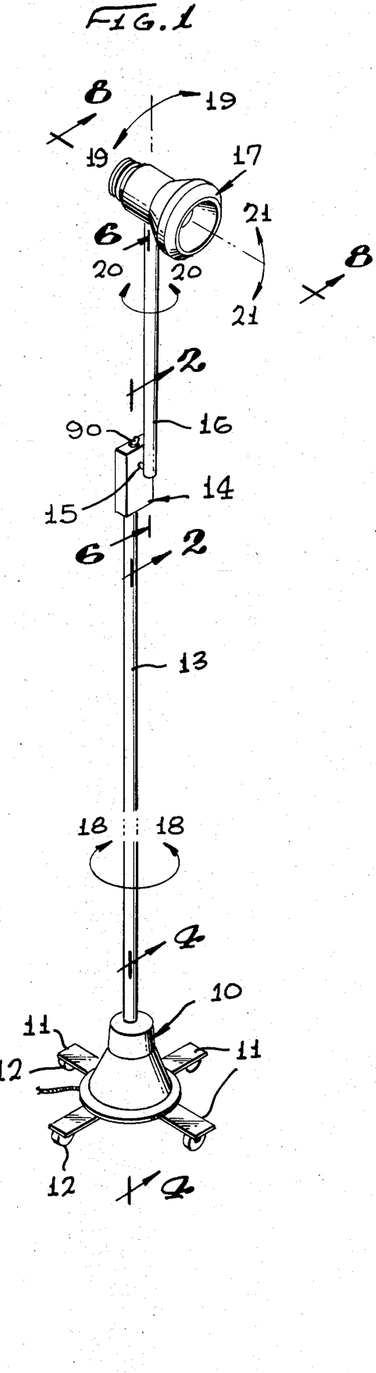
FIG. 1 is a foreshortened perspective view of the preferred embodiment.

The embodiment of the invention described is envisioned, but not limited to, that of a free standing examination light for medical or other uses. Referring to FIG. 1, its essential components are a base support means 10 which has four horizontal projections 11 to provide stability. Affixed to the underside of each projection is a castered wheel 12 to enable the light to be rolled across a floor. Projecting vertically from the base support means is a vertical shaft 13. The upper end of the vertical shaft terminates in a parallelepiped housing 14 which serves as a support means and enclosure for the arm counterbalance mechanism. Arm 16 is affixed to and rotates with shaft 15 which projects from housing 14. Shaft 16 supports lamp head 17 at its distal end.

Vertical shaft 13 is rotatable at the base support means 10 in the directions shown by arrows 18—18. Arm 16 pivots at shaft 15 about housing 14 in directions 19—19. Lamp head 17 rotates along with arm 16 in directions 20—20. Lamp head 17 pivots with respect to arm 16 in the directions shown by arrows 21—21.

Figure 2:
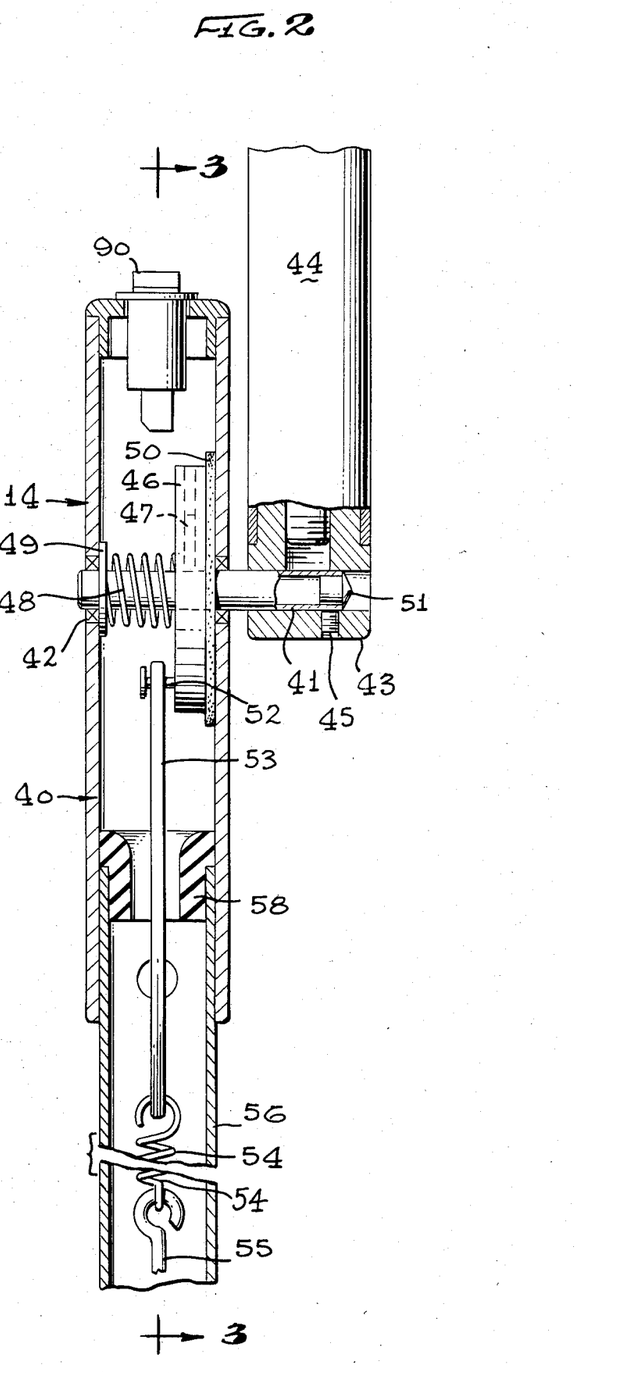
FIG. 2 is a sectional view of the counterbalance unit along line 2—2 of FIG. 1.

The counterbalance mechanism is best described by observing FIG. 2. Passing horizontally through housing 40 is hollow shaft 41 mounted in bearings 42 in opposite walls of housing 40. Shaft 41 extends beyond one wall of the housing and serves as a mounting means to which fitting 43 of arm 44 is affixed by set screw 45 which presses against plus 51 within hollow shaft 41. Within housing 40 disc 46 is affixed to shaft 41 by set screw 47. Compression spring 48 is compressed between washer 49 and disc 46 such that the reaction of the pressure by the spring through washer 49 against the wall of housing 40 forces disc 46 against fiber plate 50 andimpinges the fiber plate between the opposite wall of housing 40 and the disc 46. As the disc is affixed to shaft 41, the freedom permitting the compression of plate 50 is accomodated by axial movement of shaft 41 through bearings 42. The compression of plate 50, thereby produces friction resisting rotational motion between disc 46 and housing 40.

Projecting from disc 46 is pin 52 which is diametrically opposite the direction of arm 44. Pin 52 passes through a loop on the end of rod 53 holding it loosely to disc 46. The opposite end of rod 53 also has a loop which attaches to extension spring 54. Extension spring 54 attaches to a loop at the end of rod 55 which extends down the interior of hollow vertical shaft 56. The lower end of rod 55, not shown in the figure, has an attaching means which connects to a rigid point on shaft 56 stretching spring 54 and applying a downward force on pin 52 of disc 46 to approximately balance the gravitational force induced in the arm 44.

Figure 3:
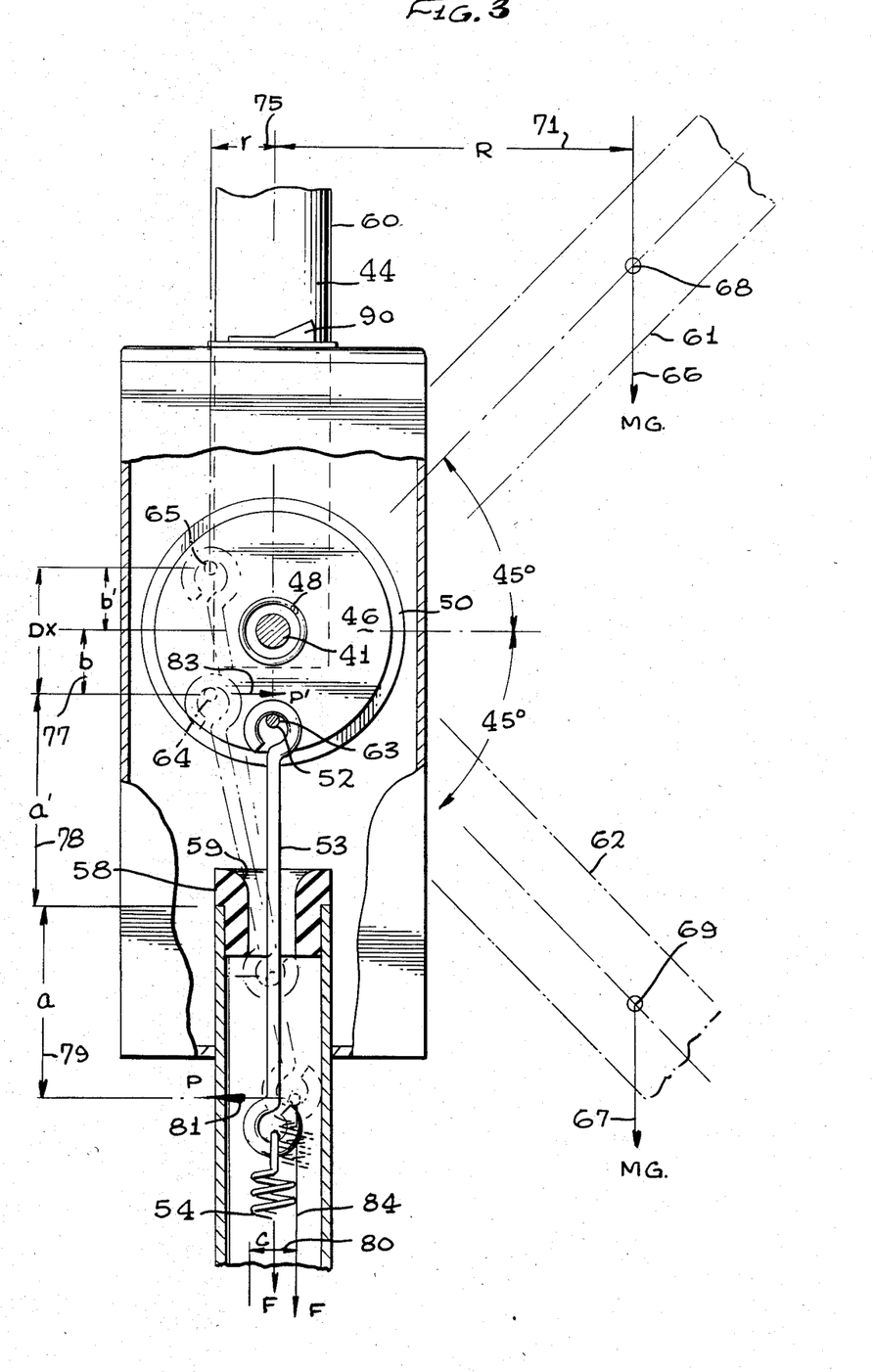
FIG. 3 is a sectional view along line 3—3 of FIG. 2.

Referring to FIG. 3, the relationships of the counterbalance mechanism can be understood. When arm 44 is in the vertical upward position 60, pin 52 in disc 46 is in the downward position 63, and the downward force provided by spring 54 tends to keep arm 44 in place. When arm 44 is moved to position 61, it rotates shaft 41 towhich it is affixed, which in turn rotates disc 46, which is also affixed to shaft 41 so that the pin 52 is moved to position 64. Spring 54 is stretched by this action, thus increasing the force applied through rod 53 to pin position 64 and through disc 46 to counter the off center force exerted by the arm in position 61. When arm 44 is moved to position 62, the spring is further stretched through rod 53 as pin 52 moves to position 65.

The downward force exerted by the arm at any position is designated by Mg and arrows 66 and 67, such as from the points 68 or 69 which is the Cg (center of gravity) of the arm 44. The counter force exerted by the spring on pin 52, or for any position ie. 64 or 65, is designated by F. The spring force can be calculated by the equation $F=KX$. Where K is the spring constant, and X is the distance the spring is stretched.

The moment, or torque applied to shaft 41, generated by the downward force of the arm can be determined as: $M=MgR$, where R is the distance of the Cg of arm 16 from the vertical axis of member 13, and is designated as line 71 in FIG. 3.

The counter-moment, or torque generated by the spring force, is determined as two components. The first is that generated by the downward force F, indicated by arrow 84, of the spring, and the second is that generated by the torque on member 53 about a fulcrum 59 located on ferule 58 due to the component P of spring force F which is orthagonal to arm 53. This torque can, depending on the position of arm 53, exert a horizontal force on pin 52 resulting in a countermoment on arm 44. The counter-moment for the first component $=Fr$, where r is the radial distance from the center of shaft 41 to the line of the direction of the application of the force F, and is designated in FIG. 3 as line 75. The counter-moment for the second component $=P'b$, where P' 83 is determined from the force P and the ratio of the distances along rod 53 on either side of point 59 of ferule 58 upon which rod 53 pivots. These distances are indicated in FIG. 3 by lines 78 and 79, and herein designated respectively as a' and a. Thus: P'b becomes P(a/a')b. Force P is determined from force F times the sine of angle of the rod 53 to the vertical, which is the ratio c/a, where c is designated by line 80. The complete equation for the counter-moment becomes: $CM=KX(r+(c/a')b)$.

A most significant factor in the design of this embodiment is the structural and dimensional relationships of the components shown in FIGS. 2 and 3. By the selection of proper dimensions, the moments (M) and counter-moments (CM) can be made nearly equal and opposite for at least a substantial portion of the range of positions of arm 44 thereby producing a unique counterbalance mechanism. To demonstrate further the principle, observe n FIG. 3 that the two positions of arm 44, 61 and 62 are selected at angles of 45 degrees above horizontal and 45 degrees below horizontal. Thus their distances from the vertical position R are the same length, and the moments in each case $M=MgR$ are also equal because the values of R are equal.

The counter-moments determined by the spring force and the geometry for these two positions is not a case of symmetry as it is for the arm. By observing the equation for the counter-moment, $CM=KX(r+(c/a')b)$, it is recognized that both X and r are variables as well as a', b, and c.

By equating the two counter-moment equations for the two positions of the arm, represented by pin locatios 64 and 65, and using the notation DX, 82, for the additional stretching of the spring from position 64 to 65, solutions for the values of X and K can be determined for the selected values as they exist for the two positions, a, b, c and r for position 64 and a', b', c' and r' for position 65. (Note that the value of b', above the horizontal becomes negative.) For the particular preferred design these values in inches are:

For pin position 64, a'=1.75, b=0.50, c=0.50, r=0.50.

For pin position 65, a'=2.8, b'=−0.50, c=0.06, r=0.50.

From this information the computatioal results shows that X=3.25 inches. Further equating the moment and counter-moment (M=CM) and knowing the values of Mg and R for the preferred design, Mg=1 pound and R=10 inches, the value required for the spring constant K is 4.8 pounds per inch.

Substituting these values of K and X for other positions, not shown, of pin 52 and arm 44 indicates that a near counter-balance exists for a substantial number of the possible positions of arm 44.

Referring to FIG. 2. fibr disc 50 is impinged between housing 40 and disc 46 by means of spring 48 which applies a force between washer 42 which lies against the opposite wall of housing 40 and disc 46 causing contact friction on either side of fiber disc 50, and resulting in a resistive force to the motion between disc 46 and housing 40. Such resistive force provides a breaking action to the motion of the arm by means of the rigid connections of arm fitting 43 to hollow shaft 41 and disc 46.

This breaking action is sufficient to prevent motion in the arm as the result of slight imbalances between the moments and counter-moments of the preferred embodiment.

Figures 4, 5:
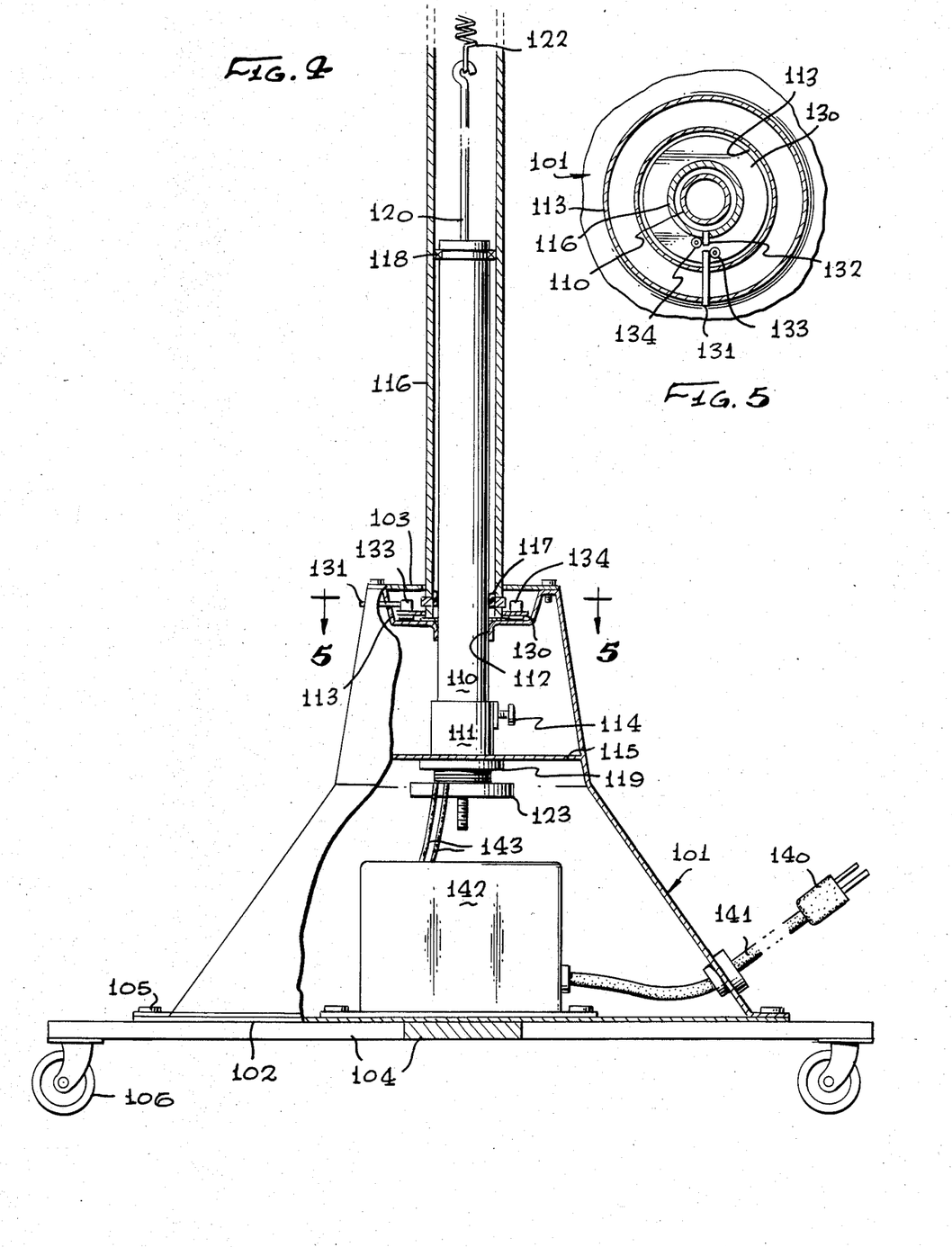
FIG. 4 is a sectioal view through the base support and rotation unit along line 4—4 of FIG. 1.
FIG. 5 is a sectional view along line 5—5 of FIG. 4.

The base support and rotation unit can be described by observing FIG. 4. In the preferred embodiment, the base housing means 101 and base closure plate 102 and cover plate 103 enclose and contain the support and rotational mechanisms for the light. They are attached to base projection bars 104, to which castered wheels 106 are affixed, by screws 105.

Tube 110 passes through opening 112 in formed recess 113 of housingmeans 101 and terminates in socket 111 where it is firmly retained by screw 114 and plate 115 by nut 119. Plate 115 impinges against the sides ofhusing means 101 and is rigid with it thereby making tube 110 rigid to the housing means. Vertical hollow shaft 116 fits around tube 110 and is separated from tube 110 and made freel rotatable by bearings 117 and 118. Rod 120 is attached to the lower end of extension spring 112, of the counterbalance mechanism, and passes downward through tube 110. the lower end of the rod 121 is threaded through bar-nut 123 which retains the rod and maintains tension on extension spring 122 thereby applying the pre-stretch, X, required by the counterbalance mechanism. Also, as the upper end of spring 122 and the counterbalance mechanism and its housing means are affixed to the upper portion, not shown, of shaft 116, the force of the tension on spring 122 is directly applied downward on shaft 116 forcing it firmly against the base of the recess 113 in housing means 101 and retaining it on tube 110.

The rotation of hollow shaft 116 about tube 110 is limited to slightly less than two full turns by means of freely moveable plate 130 which is contained within recess 113. This can be better understood by referring to FIG. 5. Plate 130 contains two stud projections 133 and 134. Inserted through housing means 101 and projecting into the recess is pin 131. Affixed to shaft 116 and also projecting outward into the recess is pin 132. Pin 131 makes contact with stud 133 and limits plate 130 to rotate slightly less than one turn. Pin 132 contacts stud 134 and thus poses a limit on the rotation of shaft 116 to slightly less than one turn more than the rotation of plate 130. Hence, the total rotation between the housing means 101 and shaft 116 is slightly less than two turns.

Figures 6, 7:
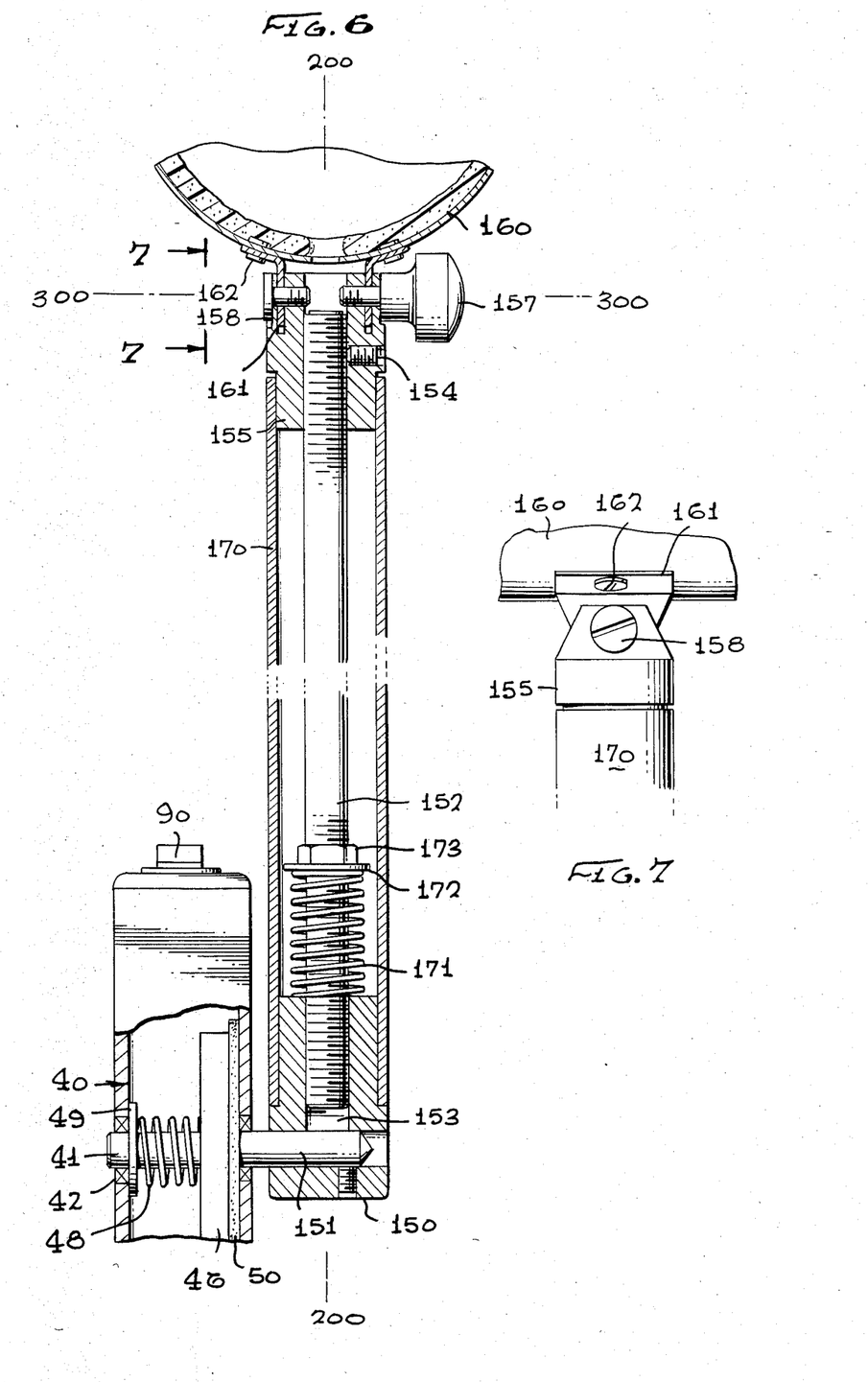
FIG. 6 is a foreshortened sectional view of the arm along line 6—6 of FIG. 1.
FIG. 7 is a view from the direction of line 7—7 of FIG. 6.

The motions of the lamp head can best be understood by referring first to FIG. 6. Fitting 150 which is affixed to shaft 116 supports threaded electrical tubing 152 which is screwed into the threaded opening 153 of fitting 150. The far end of threaded tubing 152 serves as the mounting place for the lamp head with intermediary components of brackets 161 affixed to the lamp head by rivets 162. Brackets 161, in turn, are inserted in slots of fitting 155 and held in place by thumb screw 157 and screw 158. Fitting 155 is affixed to the far end of threaded tubing 152 by set screw 154, thus anchoring it rigidly to threaded shaft 152. Sleeve 170 is contained loosely between fittings 150 and 155 and serves as a protective cover that permit the components within its lumen to be freely moveable.

Thusly, the lamp head 160 is rotated about axis 200-200, threaded shaft 152 rotates in the threaded hole of fitting 150. This provides the axial rotation of the lamp head. Resistance to this rotation and to cause the lamp head to remain fixed in whatever position it is placed, is accomplished by means of compression spring 171 which is compressed between knurled nut 172 and fitting 150. Knurled nut 172 is locked onto the threaded shaft by jamb nut 173. The resistance is caused by the force that the spring exerts on the threaded connection of the tube and the fitting. The magnitude of the force can be adjusted by screwing the knurled nut along the threaded tube to a new location and locking it in place by tightening the jamb nut against it.

The motion of the lamp head about axis 300-300 is provided by the alignment of thumb screw 157 and screw 158 which pass through appropriate holes in brackets 161 and thread into fitting 155. The arrangement is better visualized by referring to FIG. 7. Thumb screw 157 and screw 158 serve the additional purpose of providing resistance to fit the lamp head in any desired position within its range of motion. Screw 158 is tightened to set the resistance close to the desired amount, and thumb screw 157 is then tightened or loosened to fine adjust the resistance.

Figure 8:
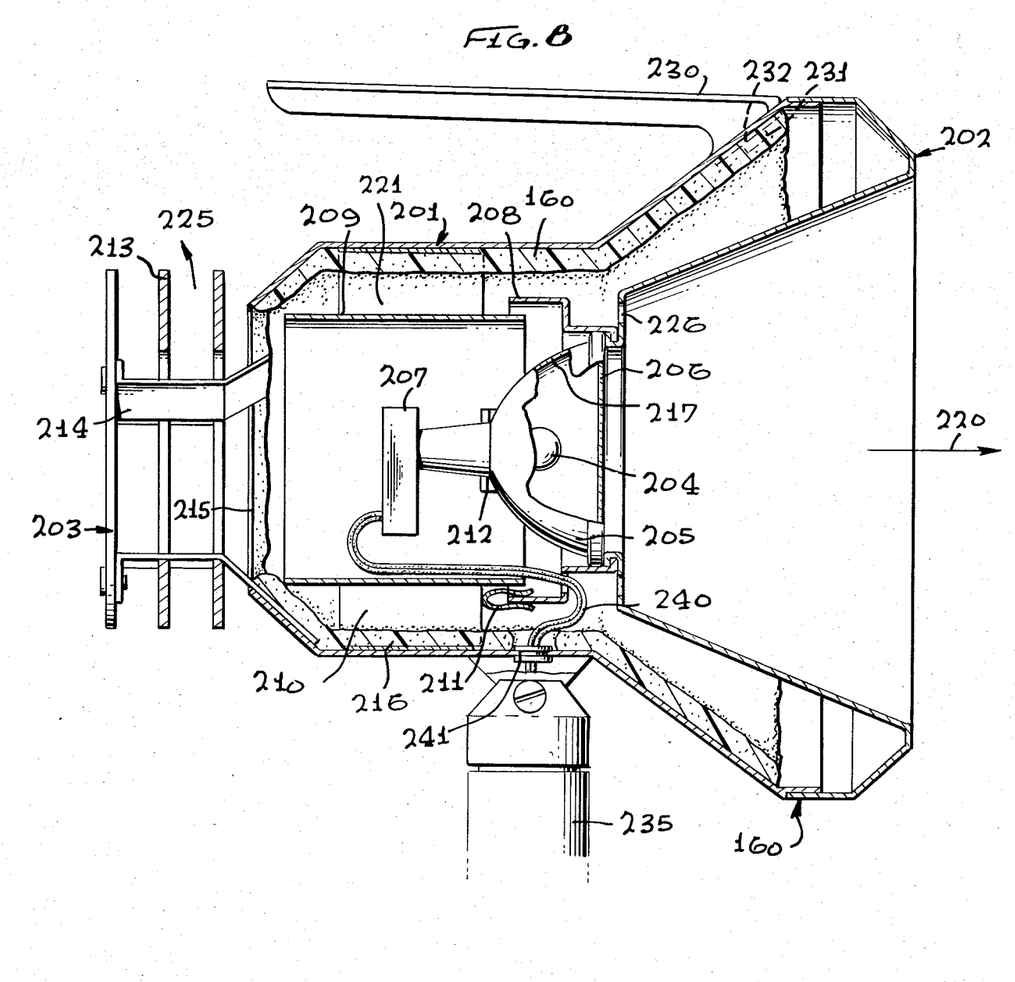
FIG. 8 is a sectional view of the lamp head along line 8—8 of FIG. 1.

For a description of the lamp head refer to FIG. 8. The lamp head comprises a housing means 201 a bezel means 202 and a louvre means 203 which enclose the lamp 204, the reflector 205, the filter plate 206 and the electrical socket 207. Also within the housing means is collar 208 which is affixed to bezel 202 and cylindrical shield 209 which is centered and fixed in the housing means by plates 210. Clips 211 attached to collar 208 impinge against shield 209 thereby holding, by friction, bezel 202 to the case means.

Spring clip fork 212 is also attached to collar 208 (attachment not shown) with the tines of its fork straddling reflector 205 thereby applying spring force against reflector 205 to hold it in place. Filter glass 206 is in place between the reflector and the attachment of the collar to the bezel such that it is also held in place by the spring clip fork. The louvres 213 are supported off the housing means by brackets 214 through opening 215. The inner surface of the housing means is lined with a thermal insulating material 216.

The reflector 205 is fabricated of pyrex glass, and has a dichroic coating 217 on its inner surface. This coating reflects the visible light portion of the electromagnetic spectrum from the lamp 204 in the direction 220. The heat portion of the spectrum, or infrared, is transmitted by this coating and thus passes through the glass of the reflector and impinges mainly on shield 209. Shield 209 absorbs the infrared energy and reradiates thermal energy across air space 221 to thermal insulation 216. The heat from the shield and other components also heats the air within the housing means causing the air to pass through opening 215 and between the louvres 213 and rise in the direction 225. This causes air to flow into the housing means through openings 226 in bezel 202. Thus a convection current of air is set up, flowing in through the bezel and out through the louvres, carrying the heat generated by the lamp with it. The insulating material 216 in the inner surface of the housing means acts as a thermal resistance which limits the heat that flows through the housing means wall to a minimal amount, such that natural convection external to the housing conducts this heat away and prevents the external surface of the housing means from becoming hot.

Handle 230 is affixed to the exterior of the housing means 201 by screws 231 through plate 232. The handle is located diametrically opposite the attachment of the housing means to the support arm 235. Thus, the handle is conveniently placed so that the lamp head can be easily moved back and forth about its transverse axis, or by a rotating motion, revolved about its vertical axis.

The components and connections for supplying electrical energy to the lamp is derived from the electrical power supply through plug 140, FIG. 4, and is conducted through line cord 141 to converter 142. Converter 142 alters the power to the form and value required by the specific lamp used. Insulated conductors 143 carry the converted power through the hollow tubes to the ON/OFF switch 90, FIGS. 2 and 3, and then through hollow shaft 41 and threaded tube 152 FIG. 6 to lamp head 160. (Conductors are not shown within hollow tubes and shafts.) Conductors 240 lead into the lamp head housing means 201, FIG. 8, through opening 241 to socket 207 which makes the electrical connections to lamp 204.

What is claimed is:

1. An examination light comprising:
    a base support means which has four horizontal projections placed at right angles to each other to provide stability; affixed to the underside and at the distal end of each is a castered wheel to enable the light to be rolled across a floor; superior to the horizontal projections and rigidly attached thereto is a case means for enclosing electrical power conversion means and for providing a support and rotation means for the structures of the light, which are:
    a shaft means projecting vertically from the base means,
    a housing means attached to the upper end of the vertical shaft means,
    a counterbalance means within the housing means for balancing a moveable arm exterior to the housing means comprising:
    a horizontal shaft supported within the housing means, mounted on bearings located in opposing walls of the housing means with one end projecting through one wall to the outside of the housing means and to which is rigidly affixed to that end an arm means, and,
    a metal disc within the housing means rigidly affixed to the shaft close to one wall of the housing means; located on the disc and projecting away from the nearby wall is a pin perpendicular to the plane of the disc,
    a fiber plate through which the horizontal shaft passes located between the metal disc and the nearby wall of the housing means,
    a compression spring through which the horizontal shaft passes located betwen the metal disc and the far wall of the housing means, terminating in a bearing washer against the housing means, such that the compression spring acting against the housing means reacts against the metal disc causing the horizontal shaft to displace along its axis until the metal disc impinges on the fiber plate thereby compressing the fiber plate between the metal disc and the nearby wall of the housing means, and establishing a frictional resistance to any rotation of the metal disc,
    a rod means extending from the projecting pin on the metal disc in a direction away from the orizontal shaft and passing through a ferrule, said ferrule being rigidly fixed with the housing means, said ferrule limiting the lateral travel of the rod means, said rod means presenting a loop on each end, one end for encircling the pin and providing an attachment with pivoting freedom as the metal disc is rotated, and the other end for attaching to an extension spring,
    an extension spring attached to the end of the rod away from the metal disc and the ferrule, pre-extended a determined distance between the rod and an attachment and adjustment means rigid with the housing means, to apply a counterforce opposing the force imposed by the arm means for any position of the arm means; said counterforce being the product of the direct tension of the extension spring on the pin as it is applied to the off-center position of the pin on the disc, and to the side force against the pin on the disc caused by the restrictive effect of the ferrule against the rod preventing a lateral displacement of the rod for the off-center position of the pin,
    a moveable arm means pivoted and supported from a horizontal shaft extending from the housing means,
    a lamp head means affixed and pivoted on the distal end of the moveable arm means,
    a light source within the lamp means,
    an optical means within the lamp head means for directing the light from the lamp head in the form of an optical beam, and,
    a heat rejection means within the lamp head means that separates the heat from the light, and,
    a means that dissipates the heat rejected from the light within the lamp head means to the surrounding atmosphere.

2. The device as defined in claim 1 wherein the rotation means for the vertical shaft is retained within a flat circular recess at the top of the base housing means and is comprised of a metal tube rigidly affixed to the housing means and projecting vertically therefrom, over which fits a hollow vertical shaft resting on the flat bottom of the recess, and spaced from the metal tube by bearings such that the hollow vertical shaft is freely rotatable on the tube, and also within the recess and surrounding the shaft is a metal disc presenting two short vertical stud projections from its upper surface at different radial distances from its center; projecting inward from the rim of the recess is a pin rigidly affixed to the housing means which intersects the outermost stud such that the disc is free to make slightly less than one rotation, and projecting outward and rigidly affixed to the hollow vertical shaft is a pin which intersects the innermost stud such that the hollow vertical shaft is free to make slightly less than one rotation with respect to the disc, thereby in combination the hollow vertical shaft has a rotation capability when added to that of the disc of slightly less than two revolutions.

3. The device as defined in claim 1 wherein the lamp head means, affixed to the moveable arm means, is rotatable with respect to the axis of the moveable arm means; said motion being implemented by means of a threaded shaft rigidly affixed to a fitting integral with the lamp head means, extending the length of and within the arm means, and threaded into the fitting which attaches the arm means to the horizontal shaft, whereby rotating the lamp head means rotates the threaded shaft within the threads in the fitting; and wherein said rotation is resisted by friction resulting from the forces of a compression spring through which the threaded shaft passes, and which is compressed between a knurled nut fixed in place on the threaded shaft and the fitting into which the threaded shaft is threaded.

4. The device as defined in claim 1 wherein heat is removed from the light by use of an optical reflector made of a transparent thermally resistive glass material coated on its reflecting surface with a vacuum deposited dichroic reflecting film; said film reflecting the light portion of the electromagnetic spectrum radiated by the lamp into a beam of light directed out of the lamp head means, and said film transmitting and allowing to pass through the glass of the reflector the heat portion of the electromagnetic spectrum where it impinges internally within the lamp head means.

5. The device as defined in claim 1 wherein the heat rejected from the light within the lamp head means is dissipated to the surrounding atmosphere by use of a cylindrical shield surrounding the light source and optics to absorb the heat radiated therefrom, and by application of a thermal insulation material to the inner surface of the lamphead wall to impede the flow of heat through the lamp head wall so as to prevent the external surface of the lamp head from getting hot; said cylindrical shield transferring its heat to the air within the lamp head causing said air to rise and pass out through openings in the rear of the lamp head, and to cause the replacement of said air with cool air drawn into the lamp head through openings in the front of the lamp head; said displacement of air transferring the heat from within the lamp head to the surrounding atmosphere.

* * * * *